United States Patent
Shiiya et al.

(10) Patent No.: US 12,460,972 B2
(45) Date of Patent: Nov. 4, 2025

(54) COLORIMETRY DEVICE, PRINTING DEVICE, AND CALIBRATION METHOD

(71) Applicant: SEIKO EPSON CORPORATION, Tokyo (JP)

(72) Inventors: Tomoyuki Shiiya, Matsumoto (JP); Yuji Hanaoka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 271 days.

(21) Appl. No.: 17/823,041

(22) Filed: Aug. 29, 2022

(65) Prior Publication Data
US 2023/0065467 A1 Mar. 2, 2023

(30) Foreign Application Priority Data
Aug. 31, 2021 (JP) ................ 2021-140966

(51) Int. Cl.
*G01J 3/52* (2006.01)
(52) U.S. Cl.
CPC .................... *G01J 3/524* (2013.01)
(58) Field of Classification Search
CPC ...... G01J 3/524; G01J 3/10; G01J 3/28; G01J 3/50; G01J 3/027; H04N 1/00087
See application file for complete search history.

(56) References Cited

U.S. PATENT DOCUMENTS

| | | | |
|---|---|---|---|
| 10,681,235 B2 | 6/2020 | Date et al. | |
| 2010/0171971 A1* | 7/2010 | Hoshii | H04N 1/62 358/1.9 |
| 2013/0135648 A1* | 5/2013 | Sumioka | G01J 3/524 358/1.13 |
| 2013/0135650 A1* | 5/2013 | Kuronuma | H04N 1/00031 358/1.13 |
| 2015/0248597 A1* | 9/2015 | Matsumoto | H04N 1/48 358/1.9 |
| 2015/0346028 A1* | 12/2015 | Furuta | G01J 3/0286 356/408 |
| 2018/0288240 A1* | 10/2018 | Xu | H04N 1/6033 |
| 2019/0109957 A1 | 4/2019 | Date et al. | |

FOREIGN PATENT DOCUMENTS

| | | |
|---|---|---|
| JP | 2002-94817 A | 3/2002 |
| JP | 2013-130561 | 7/2013 |
| WO | 2017/169508 | 10/2017 |

* cited by examiner

*Primary Examiner* — Tarifur R Chowdhury
*Assistant Examiner* — Carlos Perez-Guzman
(74) *Attorney, Agent, or Firm* — WORKMAN NYDEGGER

(57) ABSTRACT

A colorimetry device includes: a colorimetry unit including an irradiation unit including a substrate provided with a LED, and a light-receiving unit configured to receive reflected light that is light irradiated from the LED and reflected by the color chart image, the colorimetry unit being configured to perform colorimetry of the color chart image; a movement unit configured to cause the colorimetry unit to reciprocate along an intersecting direction; a calibration member provided in the intersecting direction; a temperature sensor configured to detect a temperature of the LED or a temperature of the substrate; and a colorimetry device control unit configured to move the colorimetry unit by the movement unit to a calibration member and calibrate the colorimetry unit when determining that the colorimetry unit is to be calibrated for the colorimetry of the color chart image based on the temperature detected by the temperature sensor.

8 Claims, 11 Drawing Sheets

COLORIMETRY DEVICE, PRINTING DEVICE, AND CALIBRATION METHOD

The present application is based on, and claims priority from JP Application Serial Number 2021-140966, filed Aug. 31, 2021, the disclosure of which is hereby incorporated by reference herein in its entirety.

BACKGROUND

1. Technical Field

The present disclosure relates to a colorimetry device, a printing device, and a calibration method.

2. Related Art

Typically, colorimetry machines are calibrated to suppress errors in colorimetry of images printed on media. JP-A-2002-094817 discloses a technology in which, each time colorimetry of color patches arranged in a matrix is performed by one line, a colorimetric head is moved onto a reference white and colorimetry of a reference white board is performed to perform calibration.

However, JP-A-2002-094817 has a problem in that since calibration is performed each time colorimetry of the color patches arranged in a matrix is performed by one line, the time required for colorimetry of all the color patches increases.

SUMMARY

An aspect to solve the above-described problems is a colorimetry device including: a support unit configured to support a medium, a colorimetry unit including an irradiation unit including a light source configured to irradiate an image printed on the medium supported by the support unit with light and a substrate provided with the light source, and a light-receiving unit configured to receive reflected light that is light irradiated from the light source and reflected by the image, the colorimetry unit being configured to perform colorimetry of the image, a movement unit configured to cause the colorimetry unit to reciprocate along a predetermined direction, a calibration member that is provided in the predetermined direction and that is used for calibration of the colorimetry unit, a temperature detecting unit configured to detect a temperature of the light source or a temperature of the substrate, and a control unit configured to determine, for the colorimetry of the image, whether to calibrate the colorimetry unit based on the temperature of the light source or the temperature of the substrate detected by the temperature detecting unit and, when determining that the colorimetry unit is to be calibrated for the colorimetry of the image, move the colorimetry unit by the movement unit to the calibration member and calibrate the colorimetry unit.

Another aspect to solve the above-described problems is a printing device including a colorimetry device, the colorimetry device including: a support unit configured to support a medium, a colorimetry unit including an irradiation unit including a light source configured to irradiate an image printed on the medium supported by the support unit with light and a substrate provided with the light source, and a light-receiving unit configured to receive reflected light that is light irradiated from the light source and reflected by the image, the colorimetry unit being configured to perform colorimetry of the image, a movement unit configured to cause the colorimetry unit to reciprocate along a predetermined direction, a calibration member that is provided in the predetermined direction and that is used for calibration of the colorimetry unit, a temperature detecting unit configured to detect a temperature of the light source or a temperature of the substrate, and a control unit configured to determine, for the colorimetry of the image, whether to calibrate the colorimetry unit based on the temperature of the light source or the temperature of the substrate detected by the temperature detecting unit and, when determining that the colorimetry unit is to be calibrated for the colorimetry of the image, move the colorimetry unit by the movement unit to the calibration member and calibrate the colorimetry unit.

A yet another aspect to solve the above-described problems is a calibration method by a colorimetry device including a colorimetry unit that includes a light source configured to irradiate an image printed on a medium supported by a support unit with light and a substrate provided with the light source and that is configured to perform colorimetry of the image and a temperature detecting unit configured to detect a temperature of the light source or a temperature of the substrate, the method including: determining, for the colorimetry of the image, whether to calibrate the colorimetry unit based on the temperature of the light source or the temperature of the substrate detected by the temperature detecting unit and when determining that the colorimetry unit is to be calibrated for the colorimetry of the image, moving the colorimetry unit to a calibration member used for calibration of the colorimetry unit and calibrating the colorimetry unit.

DESCRIPTION OF EXEMPLARY EMBODIMENTS

First Embodiment

Figure 1:
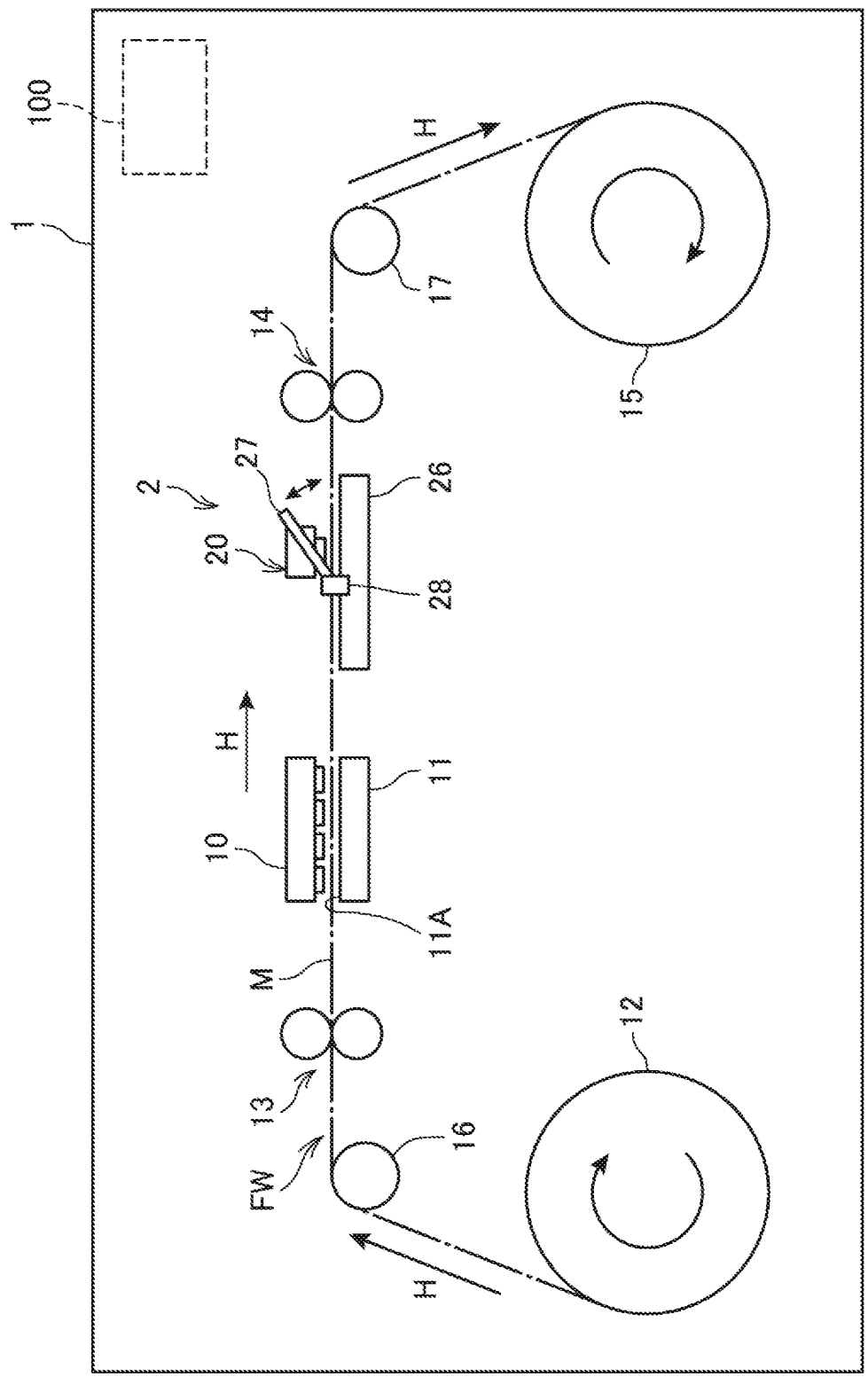
FIG. 1 is a plan view illustrating a general configuration of a printer.

FIG. 1 is a plan view illustrating a general configuration of a printer 1.

The printer 1 is an ink-jet type printing device that ejects ink to a printing medium M to form an image on a printing surface of the printing medium M.

The printer 1 is an example of a "printing device".

The printer 1 includes a printing head 10 that ejects ink to the printing medium M. The printer 1 performs color printing by ejecting ink of a plurality of colors from the printing head 10. For example, the printing head 10 ejects ink of five colors of yellow, magenta, cyan, black, and white from a different nozzle row, respectively. The number of colors of ink used by the printer 1 is not particularly limited. A platen 11 is disposed at a position facing the printing head 10. The platen 11 supports the printing medium M by a support surface 11A that is a flat surface at a position facing the printing head 10.

The printing medium M is an example of a "medium".

The printing medium M is not particularly limited as long as it has a sheet shape. Paper, sheets made of synthetic resin, fabrics, or the like can be used therefor. The printing medium M may be a cut sheet cut into standard sizes. However, in the present embodiment, a configuration in which a long printing medium M is used will be described as an example.

The printer 1 includes a transport unit 102 that transports the printing medium M. The transport unit 102 includes a feeding roller 12 around which the printing medium M is wound into a roll shape, a transport roller 13, a transport roller 14, and a winding roller 15. The transport rollers 13 and 14 nip the printing medium M by a pair of rollers, and send the printing medium M in a transport direction H. The printing medium M on which printing was performed by the printing head 10 is wound around the winding roller 15. The transport rollers 13 and 14 are driven by a transport motor 1021 to be described later. Furthermore, the feeding roller 12 and the winding roller 15 are driven by the power of the transport motor 1021 or another motor. The transport rollers 13 and 14, the feeding roller 12, and the winding roller 15 are disposed along a transport path FW, which is the transport route through which the printing medium M is transported in the printer 1, and transport the printing medium M in the transport direction H under the control of a control device 100 to be described later. The printer 1 includes a relay roller 16 that guides the printing medium M fed from the feeding roller 12 to the transport roller 13, and a relay roller 17 that guides the printing medium M to the winding roller 15. The relay rollers 16 and 17 may be constituted by a plurality of rollers.

The printer 1 includes a colorimetry device 2. The colorimetry device 2 is a device that can be retrofitted to the printer 1. The colorimetry device 2 is provided downstream of the printing head 10 in the transport direction H. The colorimetry device 2 performs colorimetry of a color chart image CG printed on the printing medium M. The color chart image CG is an image printed on a color chart. A color chart is a printed material on which a plurality of colors serving as reference printing colors are disposed side by side in a predetermined size. Color charts are used to adjust colors of a printed material printed by the printer 1 or to check printing colors.

The color chart image CG is an example of an "image".

Figure 2:
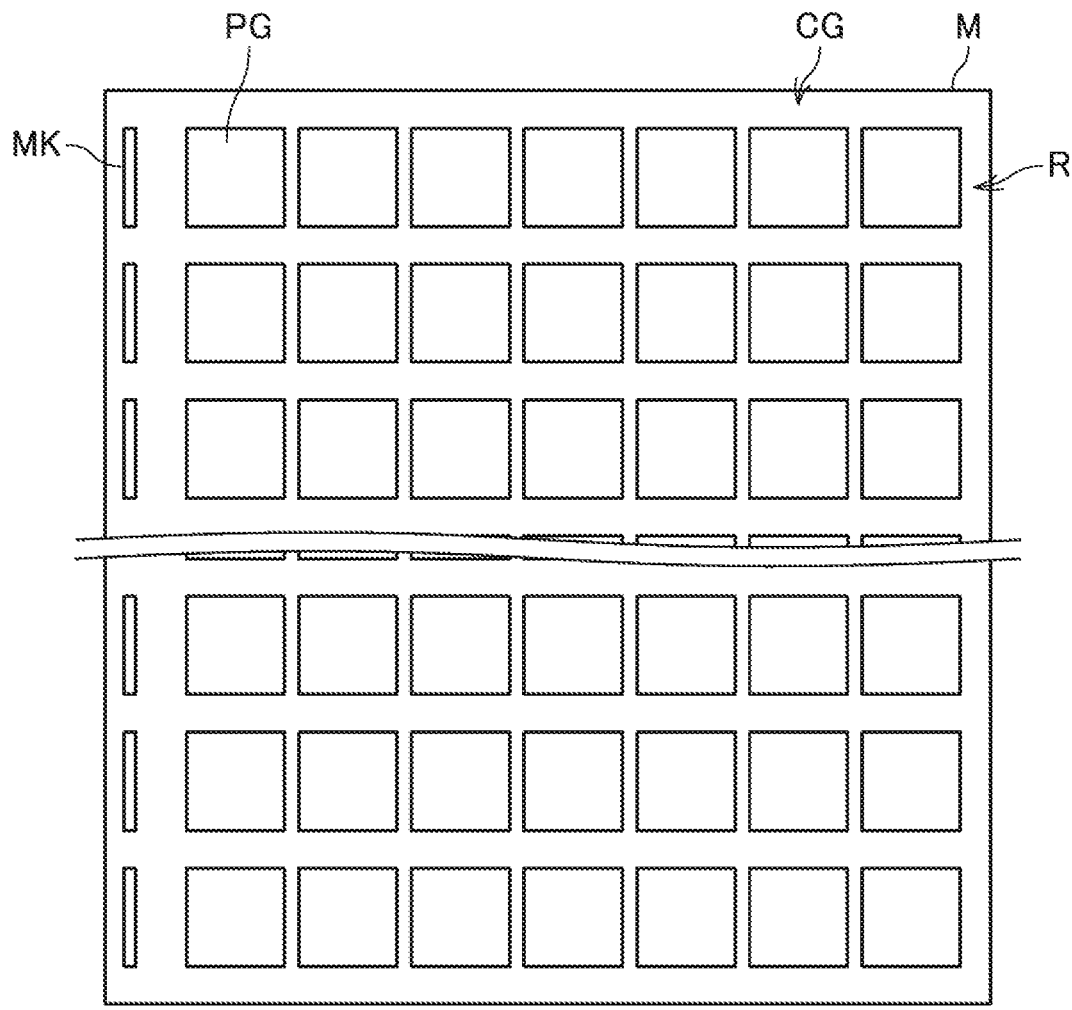
FIG. 2 is a view illustrating an example of a color chart image.
Figure 2:
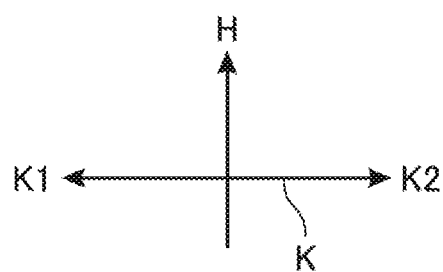

FIG. 2 is a view illustrating an example of the color chart image CG printed on the printing medium M.

The color chart image CG includes a plurality of patch images PG. The plurality of patch images PG are printed aligned side by side in an intersecting direction K intersecting the transport direction H. In the present embodiment, a direction orthogonal to the transport direction H is illustrated as the intersecting direction K. The shapes of the patch images PG of the present embodiment are illustrated as rectangles. The color chart image CG includes a corresponding patch image PG for each of a plurality of colors serving as reference printing colors.

The intersecting direction is an example of a "predetermined direction".

Hereinafter, one row of patch images PG aligned in the intersecting direction K is referred to as a patch image row and is denoted by a reference sign "R". In FIG. 2, a case is illustrated in which one patch image row R includes seven patch images PG in the intersecting direction K. However, the patch images PG included in a patch image row R may be less than seven or more than seven.

The color chart image CG includes a plurality of patch image rows R aligned side by side along the transport direction H. The color chart image CG illustrated in FIG. 2 includes at least eight patch image rows R or greater.

The color chart image CG includes marks MK in the first direction K1 of the patch image row R in the intersecting direction K. The color chart image CG includes a mark MK for each patch image row R. The mark MK is a marker for starting a timer control related to the colorimetry of the patch image row R.

Figure 3:
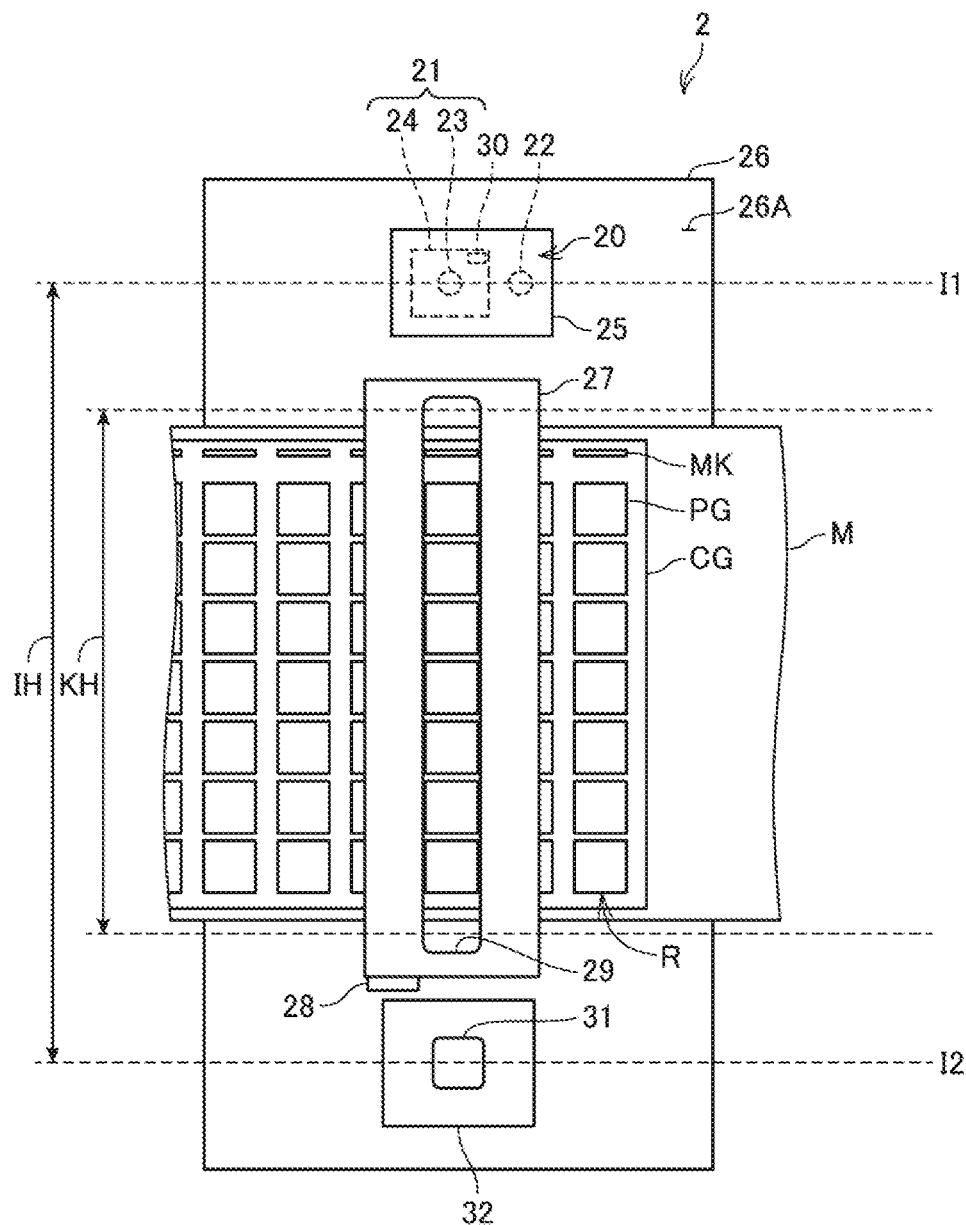
FIG. 3 is a plan view illustrating a configuration of main parts of a colorimetry device.
Figure 3:
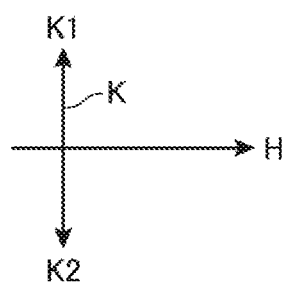

FIG. 3 is a plan view illustrating a configuration of main parts of the colorimetry device 2.

The colorimetry device 2 includes a colorimetry unit 20. The colorimetry unit 20 includes an irradiation unit 21 and a light-receiving unit 22. The irradiation unit 21 includes a light-emitting diode (LED) 23 and a substrate 24 provided with the LED 23. The light-receiving unit 22 includes a light-receiving sensor. The colorimetry unit 20 irradiates the printing medium M with light by the LED 23 and receives reflected light reflected by the printing medium M at the light-receiving unit 22 to perform colorimetry. The colorimetry unit 20 may include an optical element that separates, reflects, guides, or splits light received by the light-receiving unit 22. The colorimetry unit 20 may be a color meter, or may be a spectrophotometer.

The LED 23 is an example of a "light source".

The colorimetry device 2 includes a carriage 25 on which the colorimetry unit 20 is mounted. The carriage 25 reciprocates along the intersecting direction K along a guide shaft installed extending in the intersecting direction K. As the carriage 25 reciprocates, the colorimetry unit 20 reciprocates along the intersecting direction K. The carriage 25 is coupled to a carriage driving motor 2021 via a driving belt (not illustrated) or the like. Rotation in the forward direction of the carriage driving motor 2021 moves the carriage 25 in a second direction K2, while rotation in the reverse direction of the carriage driving motor 2021 moves the carriage 25 in the first direction K1. The movable range IH of the carriage 25 ranges from a standby position I1 to a calibration execution position I2 in the intersecting direction K. The movable range IH includes a colorimetry capable range KH in which the colorimetry unit 20 can perform colorimetry. The colorimetry capable range KH corresponds to the width of the transport path FW in the intersecting direction K. The standby position I1 is a position downstream of the colorimetry capable range KH in the first direction K1. The calibration execution position I2 is a position downstream of the colorimetry capable range KH in the second direction K2.

The colorimetry device 2 includes a support member 26 having an upper surface 26A that is a flat surface. The support member 26 supports the printing medium M by the upper surface 26A. A medium holder 27 is attached to the support member 26. The medium holder 27 is movably supported by a driving unit 28, and presses the printing medium M against the support member 26. The medium holder 27 presses on the printing medium M, which eliminates or reduces floating of the printing medium M. This makes it possible, when the colorimetry unit 20 performs colorimetry, to prevent errors in colorimetry caused by floating or twisting of the printing medium M.

The support member 26 is an example of a "support unit".

The medium holder 27 is a flat plate-shaped member. A longitudinal-shaped colorimetric window 29 extending in the intersecting direction K is formed in the medium holder 27. The colorimetric window 29 is an opening that penetrates the medium holder 27 and exposes the printing medium M. The LED 23 is mounted on the carriage 25 to face the printing medium M. As the carriage 25 moves in the intersecting direction K, the LED 23 moves over the colorimetric window 29 along the direction in which the colorimetric window 29 extends, and irradiate the printing medium M with light via the colorimetric window 29. Consequently, the colorimetry device 2 can perform colorimetry of the color chart image CG exposed from the colorimetric window 29.

The colorimetry device 2 includes a temperature sensor 30 disposed in the substrate 24. The temperature sensor 30 detects the temperature of the substrate 24.

The temperature sensor 30 is an example of a "temperature detecting unit".

The colorimetry device 2 includes a calibration member 31 used for calibration of the colorimetry unit 20. The calibration member 31 is provided in a base unit 32 disposed on the upper surface 26A of the support member 26. The calibration member 31 is a white member, such as a white board referenced herein in relation to JP-A-2002-094817 discussed herein, used for calibration of the colorimetry unit 20. The calibration member 31 is provided at a position that is in the second direction K2 of the colorimetry capable range KH in the intersecting direction K, and that is irradiated with light of the LED 23 when the carriage 25 is located in the calibration execution position I2.

Calibration of the colorimetry unit 20 means irradiating the calibration member 31 with light by the LED 23, and acquiring the amount of light of reflected light reflected by the calibration member 31 at the light-receiving unit 22. The amount of light of reflected light obtained in the calibration of the colorimetry unit 20 is used as a reference amount of light for correcting the colorimetric value obtained for each patch image PG.

Figure 4:
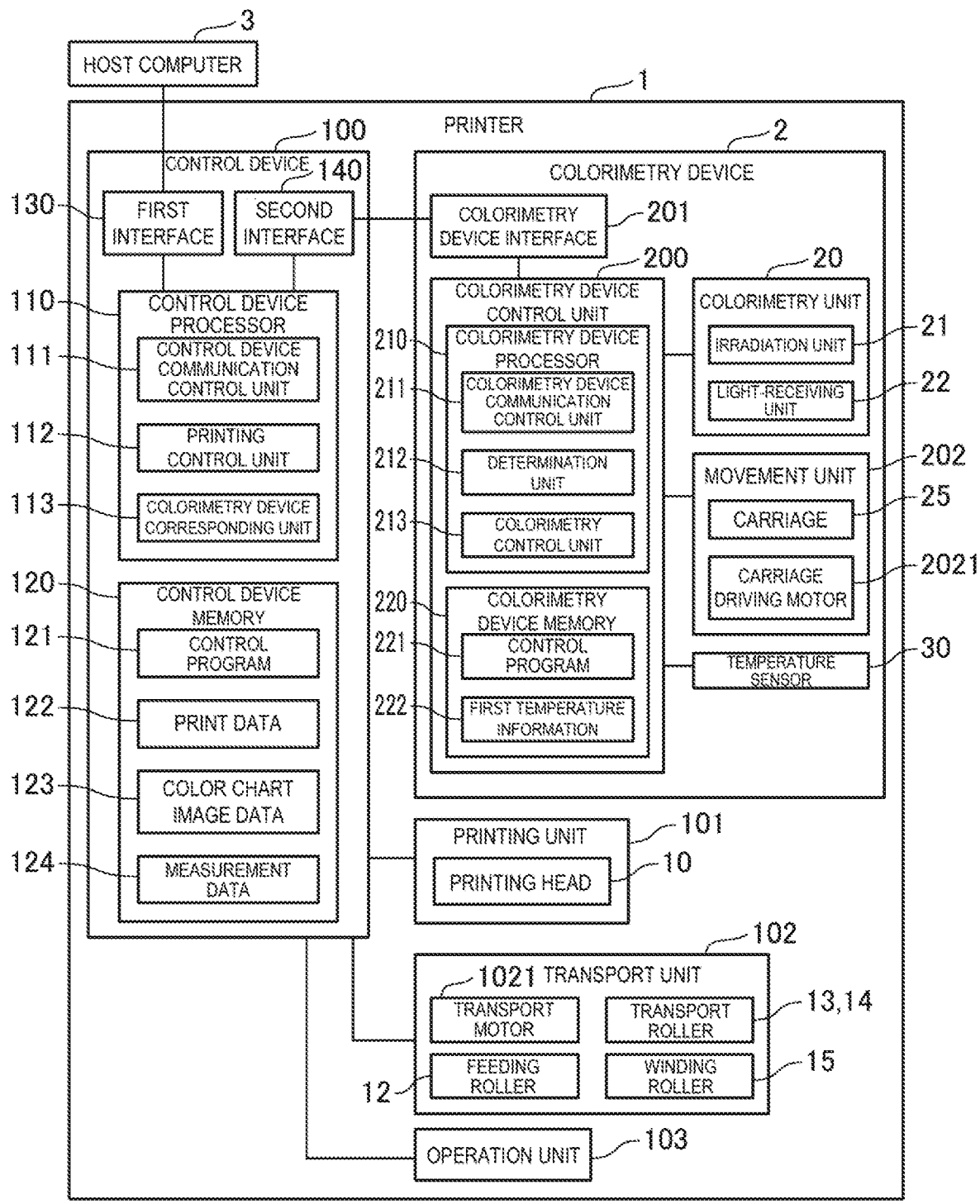
FIG. 4 is a block diagram illustrating a configuration of a control system of a printer.

FIG. 4 is a block diagram illustrating a configuration of a control system of the printer 1.

The printer 1 includes a control device 100. The control device 100 includes a control device processor, which is a processor such as a central processing unit (CPU), and a control device memory 120. The control device 100 controls the components of the printer 1 by the control device processor 110 reading out and executing a control program 121 stored in the control device memory 120. By reading out and executing the control program 121, the control device processor 110 functions as a control device communication control unit 111, a printing control unit 112, and a colorimetry device corresponding unit 113.

The control device memory 120 stores the control program 121, any other programs executed by the control device processor 110, and data processed by the control device processor 110. The control device memory 120 includes a non-volatile storage area. Furthermore, the control device memory 120 may include a volatile storage area and constitute a work area for the control device processor 110.

In addition to the control program 121, the control device memory 120 stores print data 122, color chart image data 123, and measurement data 124, for example.

The print data 122 is data transmitted from a host computer 3. The print data 122 includes data of an image to be formed on the printing medium M. The print data 122 may include a print instruction command to the control device 100. The print data 122 may include data indicating printing conditions.

The color chart image data 123 is data for printing the color chart image CG.

The measurement data 124 is data indicating colorimetry results of the colorimetry device 2.

The control device 100 includes a first interface 130 and a second interface 140.

The first interface 130 is an interface coupled to a device external to the printer 1. In the present embodiment, the host computer 3 is coupled to the first interface 130. The host computer 3 outputs the print data 122 to the first interface 130. The first interface 130 may be a wired communication interface including a connector to which a cable is coupled and interface circuitry, or may be a wireless communication interface.

The second interface 140 is an interface coupled to the colorimetry device 2. The second interface 140 is a wired communication interface including a connector to which a cable is coupled and interface circuitry.

The printer 1 includes the colorimetry device 2, a printing unit 101, the transport unit 102, and an operation unit 103. The colorimetry device 2, the printing unit 101, the transport unit 102, and the operation unit 103 are coupled to the control device 100. The colorimetry device 2 will be described in detail later.

The printing unit 101 includes a configuration related to printing such as the printing head 10, a driving circuit that drives the printing head 10, and an ink supply unit that supplies ink to the printing head 10. When the printing head 10 is a serial ink-jet head, the printing unit 101 further includes a configuration related to serial ink-jet heads such as a carriage on which the printing head 10 is mounted, and a carriage driving motor that drives the carriage. The printing unit 101 ejects ink from the printing head 10 under the control of the control device 100 to form an image on the printing medium M.

The transport unit 102 includes a configuration related to transport of the printing medium M such as the transport motor 1021, the transport rollers 13 and 14, the feeding roller 12, and the winding roller 15. The transport motor 1021 is a motor that drives the transport rollers 13 and 14. The transport motor 1021 rotates under the control of the control device 100 to transport the printing medium M in the transport direction H. The transport motor 1021 may be a motor that drives the feeding roller 12 or the winding roller 15.

The operation unit 103 includes an input device operated by a user. Examples of input devices include a button and a touch panel. The operation unit 103 outputs a signal that matches an operation to the input device to the control device 100.

As described above, the control device processor 110 functions as the control device communication control unit 111, the printing control unit 112, and the colorimetry device corresponding unit 113.

The control device communication control unit 111 communicates with the host computer 3 via the first interface 130.

The printing control unit 112 controls the printing unit 101 and the transport unit 102 based on the print data 122 input from the host computer 3 via the first interface 130 to perform printing to the printing medium M.

The printing control unit 112 controls the printing unit 101 and the transport unit 102 to print the color chart image CG indicated by the color chart image data 123 to the printing medium M. At a timing when, of the patch image rows R of a printed color chart image CG, a patch image row R that is the colorimetry target reaches the colorimetric window 29 in the transport direction H, the printing control unit 112 controls the transport unit 102 to stop the transport of the printing medium M. Upon completion of colorimetry of a patch image row R that is the colorimetry target, the printing control unit 112 resumes the transport of the printing medium M, and causes a patch image row R that is the next colorimetry target to reach the colorimetric window 29.

The colorimetry device corresponding unit 113 communicates with the colorimetry device 2 via the second interface 140. The colorimetry device corresponding unit 113 outputs various types of instructions to the colorimetry device 2. The colorimetry device corresponding unit 113 receives various notifications and measurement data 124 from the colorimetry device 2. The colorimetry device corresponding unit 113 stores the received measurement data 124 in the control device memory 120. The control device communication control unit 111 transmits the measurement data 124 stored in the control device memory 120 or data obtained based on the measurement data 124 to the host computer 3. This allows the user to adjust colors of a printed material printed by the printer 1 or check printing colors by the host computer 3.

The colorimetry device 2 includes a colorimetry device control unit 200. The colorimetry device control unit 200 includes a colorimetry device processor 210, which is a processor such as a CPU, and a colorimetry device memory 220. The colorimetry device control unit 200 controls the components of the colorimetry device 2 by the colorimetry device processor 210 reading out and executing a control program 221 stored in the colorimetry device memory 220. By reading out and executing the control program 221, the colorimetry device processor 210 functions as a colorimetry device communication control unit 211, a determination unit 212, and a colorimetry control unit 213.

The colorimetry device control unit 200 is an example of a "control unit". The colorimetry device memory 220 is an example of a "storage unit".

The colorimetry device memory 220 stores the control program 221, any other programs executed by the colorimetry device processor 210, and data processed by the colorimetry device processor 210. The colorimetry device memory 220 includes a non-volatile storage area. Furthermore, the colorimetry device memory 220 may include a volatile storage area and constitute a work area for the colorimetry device processor 210.

In addition to the control program 221, the colorimetry device memory 220 stores first temperature information 222 indicating a first temperature T1, for example. The first temperature T1 will be described in detail later.

The colorimetry device 2 includes a colorimetry device interface 201, the colorimetry unit 20, a movement unit 202, and the temperature sensor 30. The colorimetry device interface 201, the colorimetry unit 20, the movement unit 202, and the temperature sensor 30 are coupled to the colorimetry device control unit 200.

The colorimetry device interface 201 is an interface coupled to the control device 100. The colorimetry device interface 201 is a wired communication interface including a connector to which a cable is coupled and interface circuitry.

The colorimetry unit 20 includes the irradiation unit 21 and the light-receiving unit 22, and performs colorimetry.

The movement unit 202 includes the carriage 25 and the carriage driving motor 2021 that drives the carriage 25. The movement unit 202 causes the carriage 25 to reciprocate in the intersecting direction K. In this way, the movement unit 202 causes the colorimetry unit 20 to reciprocate in the intersecting direction K. The carriage driving motor 2021 rotates in the forward direction and the reverse direction under the control of the colorimetry device control unit 200, and causes the carriage 25 to reciprocate in the intersecting direction K.

The temperature sensor 30 detects the temperature of the substrate 24, and outputs detection results to the colorimetry device processor 210.

As described above, the colorimetry device processor 210 functions as the colorimetry device communication control unit 211, the determination unit 212, and the colorimetry control unit 213.

The colorimetry device communication control unit 211 communicates with the control device 100 via the colorimetry device interface 201.

After the LED 23 is turned on with the start of colorimetry, the determination unit 212 determines whether the temperature of the substrate 24 detected by the temperature sensor 30 is greater than or equal to the first temperature T1 indicated by the first temperature information 222. The determination unit 212 outputs determination results to the colorimetry control unit 213.

The colorimetry control unit 213 controls the colorimetry unit 20 and the movement unit 202 to perform colorimetry of the color chart image CG. The colorimetry control unit 213 causes the carriage 25 to make one reciprocating from the standby position I1 for one patch image row R, and performs colorimetry of the one patch image row R. In the present embodiment, the colorimetry of a patch image row R is performed only in the outbound portion of a reciprocating movement of the carriage 25. However, colorimetry of the next image row R may be performed in the return portion of the reciprocating movement. Furthermore, in the present embodiment, the standby position I1 is set to a position opposite to the calibration execution position I2 in the intersecting direction K with the colorimetry capable range KH sandwiched therebetween. However, the standby position I1 may be set to a position on the side of the calibration execution position I2.

When the colorimetry device communication control unit 211 receives a colorimetry start instruction from the control device 100, the colorimetry control unit 213 causes the LED 23 to be turned on.

When the colorimetry device communication control unit 211 receives a colorimetry execution instruction from the control device 100, the colorimetry control unit 213 moves the medium holder 27 to a pressing position. The colorimetry control unit 213 operates the carriage driving motor 2021 and, while moving the carriage 25 in the second direction K2 from the standby position I1, performs colorimetry by the colorimetry unit 20. In performing colorimetry, the colorimetry control unit 213 moves the carriage 25 in the second direction K2 within a movement range that matches the width of the printing medium M in the intersecting direction K or the width of the color chart image CG in the intersecting direction K. The colorimetry control unit 213 acquires the width of the printing medium M in the intersecting direction K or the width of the color chart image CG in the intersecting direction K from printing conditions, preliminary settings, or the like, and modifies the movement range of the carriage 25 to a range that matches such an acquired width. After performing colorimetry of the colorimetry target, the colorimetry control unit 213 determines by the determination unit 212 whether the temperature of the substrate 24 is indicated to be greater than or equal to the first temperature T1 and, when it is indicated to be greater than or equal to the first temperature T1, moves the carriage 25 in the first direction K1 and returns the carriage 25 to the standby position I1 without moving the carriage 25 to the calibration execution position I2. On the other hand, after performing colorimetry of the colorimetry target, when the temperature of the substrate 24 is indicated to be less than the first temperature T1, the colorimetry control unit 213 moves the carriage 25 to the calibration execution position I2 and calibrates the colorimetry unit 20. Upon completion of calibration of the colorimetry unit 20, the colorimetry control unit 213 moves the carriage 25 in the first direction K1 and returns the carriage 25 to the standby position I1. After the carriage 25 is moved to the standby position I1, the colorimetry control unit 213 moves the medium holder 27 to a non-pressing position. When the colorimetry unit 20 is calibrated, the colorimetry control unit 213 corrects colorimetric values obtained most recently after the calibration of the colorimetry unit 20 based on the calibration performed most recently, with the corrected colorimetric values temporarily stored in the colorimetry device memory 220. On the other hand, when the colorimetry unit 20 was not calibrated before performing colorimetry of a patch image row R that is the colorimetry target, the colorimetry control unit 213 temporarily stores the colorimetric value of the patch image row R that is the colorimetry target in the colorimetry device memory 220 as is.

When the colorimetry device communication control unit 211 receives a colorimetry completion instruction from the control device 100, the colorimetry control unit 213 causes the LED 23 to be turned off.

The first temperature T1 indicated by the first temperature information 222 is determined by a predetermined process during manufacturing or shipping of the colorimetry device 2. The first temperature T1 is determined for each colorimetry device 2. Hereinafter, determination of the first temperature T1 will be described with reference to FIGS. 5 and 6.

Figure 5:
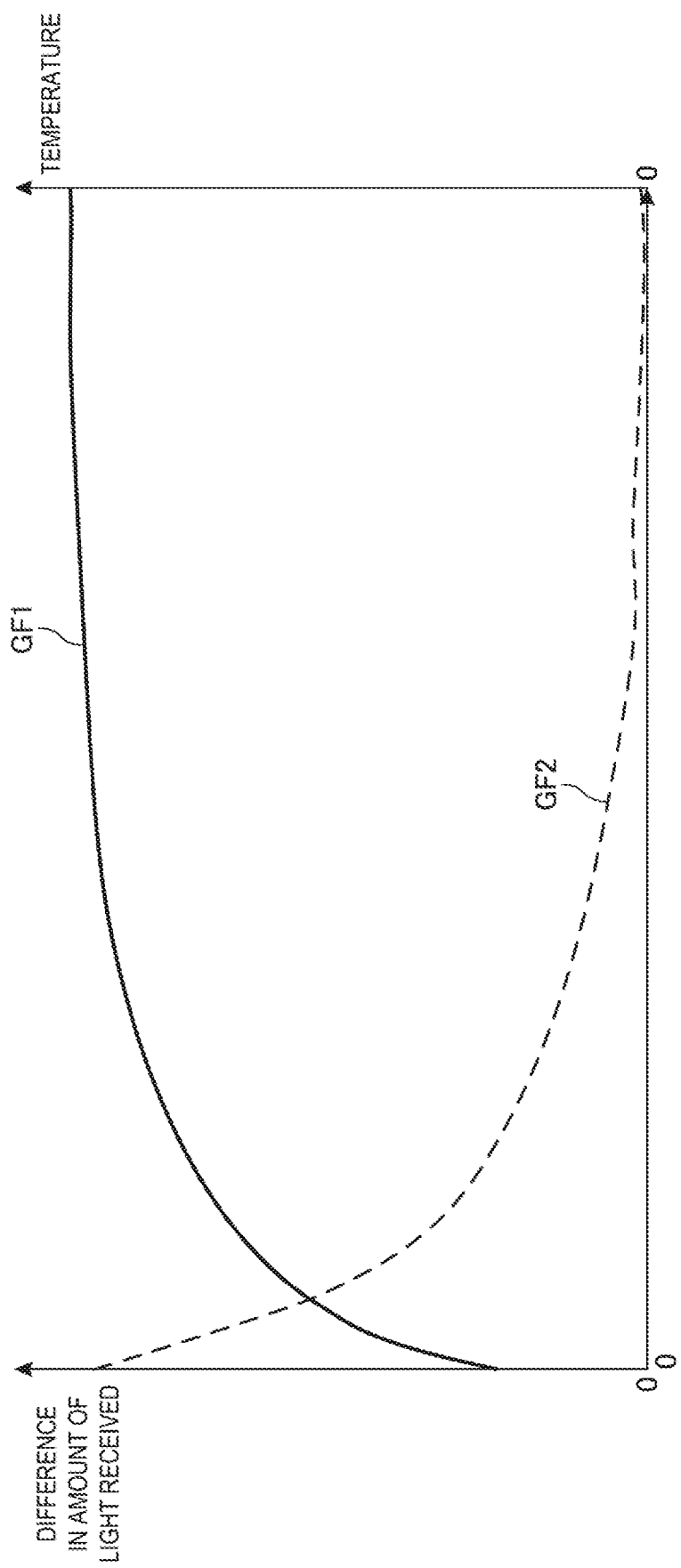
FIG. 5 is a table showing the change in temperature of a substrate and the change in difference in the amount of light received.

FIG. 5 is a table showing the change in temperature of the substrate 24 relative to the elapsed time since the LED 23 is turned on, and the change in difference in the amount of light received relative to the elapsed time. In FIG. 5, the horizontal axis indicates the elapsed time since the LED 23 is turned on. In FIG. 5, the right vertical axis indicates the difference in the amount of light received, and the left vertical axis indicates the temperature of the substrate 24.

The difference in the amount of light received indicates the difference between a reference amount of light received and the amount of light received by the light-receiving unit 22. The reference amount of light received is the amount of light received by the light-receiving unit 22 when the colorimetry unit 20 is in a temperature convergence state. A temperature convergence state is a state in which the change in temperature of the substrate 24 since the LED 23 is turned on can be considered to have settled down. The reference amount of light received is appropriately defined based on preliminary tests, simulations, or the like.

In FIG. 5, the graph GF1 indicates the change in temperature of the substrate 24 relative to the elapsed time since the LED 23 is turned on. As illustrated in the graph GF1, the change in temperature of the substrate 24 settles down as the time elapses since the LED 23 is turned on.

In FIG. 5, the graph GF2 indicates the change in difference in the amount of light received relative to the elapsed time since the LED 23 is turned on. As illustrated in the graph GF2, the change in difference in the amount of light received settles down to zero as the time elapses since the LED 23 is turned on.

In determining the first temperature T1, the graphs GF1 and GF2 are derived by a technique such as measurement. Note that the graphs GF1 and GF2 are derived for each colorimetry device 2. In determining the first temperature T1, the graph GF3 illustrated in FIG. 6 is derived based on the found graphs GF1 and GF2.

Figure 6:
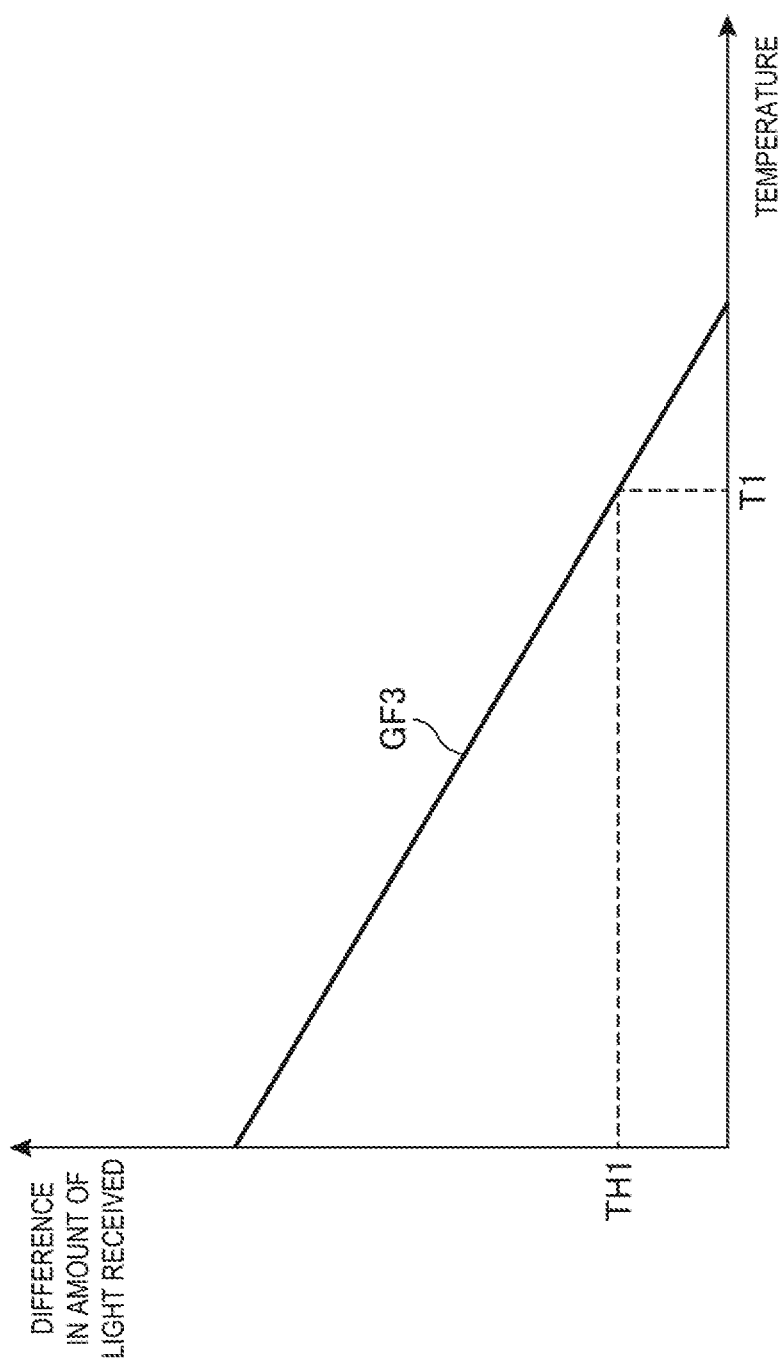
FIG. 6 is a table showing the change in temperature of a substrate and the change in difference in the amount of light received.

FIG. 6 is a table showing the change in difference in the amount of light received relative to the change in temperature of the substrate 24. In FIG. 6, the horizontal axis indicates the temperature of the substrate 24, and the vertical axis indicates the difference in the amount of light received.

The graph GF3 shown in FIG. 6 indicates the change in difference in the amount of light received relative to the change in temperature of the substrate 24, and is derived from the graphs GF1 and GF2.

The first temperature T1 is a temperature at which the difference in the amount of light received is at a first threshold TH1 in the graph GF3. The first threshold TH1 is a value indicating an upper limit of the difference in the amount of light received that is acceptable as the colorimetric accuracy of the colorimetry device 2. The first threshold TH1 is appropriately defined in advance based on preliminary tests, simulations, or the like.

Based on the graph GF3, the temperature at which the difference in the amount of light received is at the first threshold TH1 is determined as the first temperature T1. The first temperature information 222 indicating the determined first temperature T1 is stored in the colorimetry device memory 220 in a predetermined process during manufacturing or shipping of the colorimetry device 2.

Next, the operation of the printer 1 according to the present embodiment will be described.

Figure 7:
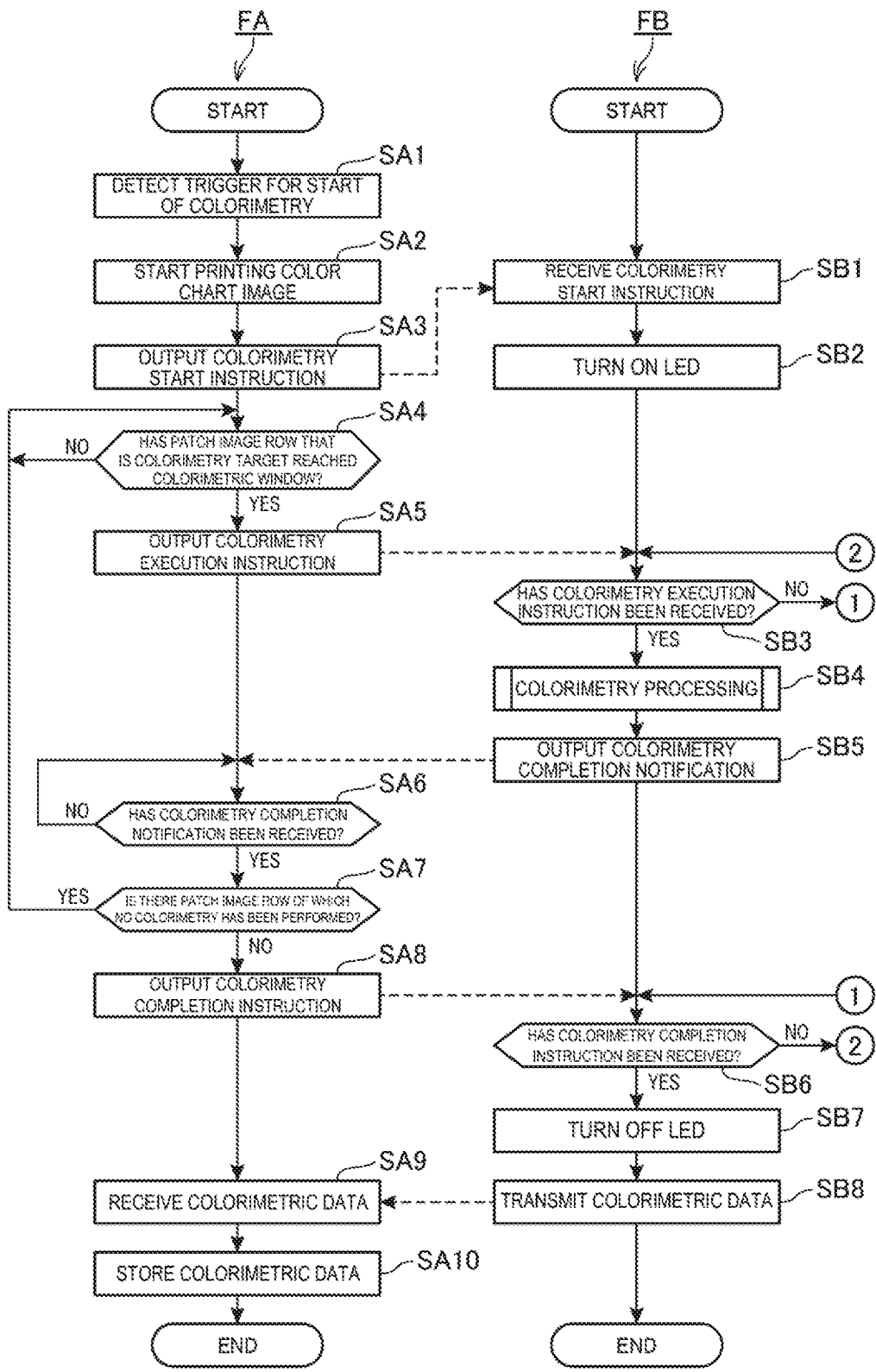
FIG. 7 is a flowchart illustrating an operation of a printer.

FIG. 7 is a flowchart illustrating an operation of the printer 1. In FIG. 7, the flowchart FA indicates the operation of the control device 100, and the flowchart FB indicates the operation of the colorimetry device 2. At the start time of the flowchart FB, the carriage 25 is located at the calibration execution position I2.

As illustrated in the flowchart FA, upon detecting a trigger for start of colorimetry (step SA1), the printing control unit 112 starts printing the color chart image CG based on the color chart image data 123 stored in the control device memory 120 (step SA2). Examples of triggers for start of colorimetry include the operation unit 103 receiving an operation instructing start of colorimetry from the user.

Next, when the printing control unit 112 starts printing the color chart image CG, the colorimetry device corresponding unit 113 outputs a colorimetry start instruction to the colorimetry device 2 (step SA3).

As illustrated in the flowchart FB, the colorimetry device communication control unit 211 of the colorimetry device 2 receives a colorimetry start instruction from the control device processor 110 (step SB1).

Next, the colorimetry control unit 213 causes the LED 23 to be turned on (step SB2).

As illustrated in the flowchart FA, the printing control unit 112 determines whether the patch image row R that is the colorimetry target has reached the colorimetric window 29 (step SA4).

When determining that the patch image row R that is the colorimetry target has not reached the colorimetric window 29 (step SA4: NO), the printing control unit 112 performs the determination of step SA4 again. On the other hand, when the printing control unit 112 determines that the patch image row R that is the colorimetry target has reached the colorimetric window 29 (step SA4: YES), the colorimetry device corresponding unit 113 outputs a colorimetry execution instruction to the colorimetry device 2 (step SA5).

As illustrated in the flowchart FB, the colorimetry device communication control unit 211 of the colorimetry device 2 determines whether a colorimetry execution instruction has been received (step SB3). When determining that no colorimetry execution instruction has been received (step SB3: NO), the colorimetry device communication control unit 211 performs the processing of step SB6.

On the other hand, when the colorimetry device communication control unit 211 determines that a colorimetry execution instruction has been received (step SB3: YES), the colorimetry control unit 213 performs colorimetry processing (step SB4).

Figure 8:
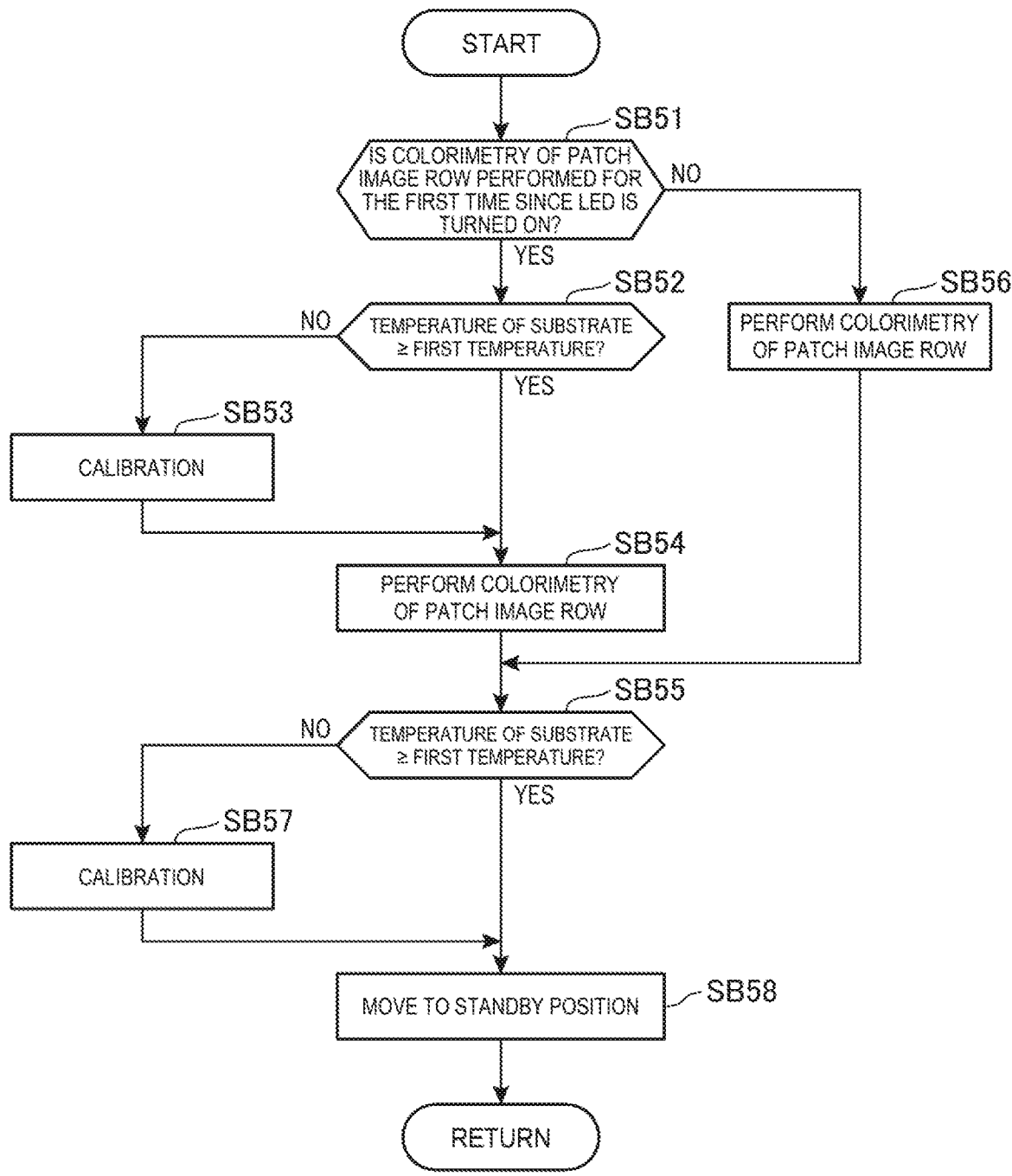
FIG. 8 is a flowchart illustrating an operation of a colorimetry device.

FIG. 8 is a flowchart illustrating an operation of the colorimetry device 2 in the colorimetry processing (step SB4) illustrated in FIG. 7.

The colorimetry control unit 213 determines whether colorimetry of the patch image row R is performed for the first time since the LED 23 is turned on (step SB51). The determination of step SB51 is performed based on the number of times a colorimetry execution instruction has been received since the LED 23 is turned on. When the colorimetry device communication control unit 211 receives a colorimetry execution instruction for the first time since the LED 23 is turned on, the colorimetry control unit 213 makes an affirmative determination in step B51. On the other hand, when the colorimetry device communication control unit 211 has received a colorimetry execution instruction several times since the LED 23 is turned on, the colorimetry control unit 213 makes a negative determination in step B51.

When determining that colorimetry of the patch image row R is performed for the first time since the LED is turned on (step SB51: YES), the colorimetry control unit 213 determines by the determination unit 212 whether the temperature of the substrate 24 is indicated to be greater than or equal to the first temperature T1 (step SB52). The determination of step SB52 is an example of "determining whether to calibrate the colorimetry unit".

When determining that the determination by the determination unit 212 indicates the temperature of the substrate 24 is less than the first temperature T1 (step SB52: NO), the colorimetry control unit 213 calibrates the colorimetry unit 20 (step SB53).

Upon completion of calibration of the colorimetry unit 20, the colorimetry control unit 213 controls the movement unit 202 to move the carriage 25 from the calibration execution position I2 to the standby position I1. When the carriage 25 reaches the standby position I1, the colorimetry control unit 213 controls the movement unit 202 again to move the carriage 25 in the second direction K2 from the standby position I1 and performs colorimetry of the patch image row R that is the colorimetry target (step SB54). Upon completion of colorimetry, the colorimetry control unit 213 determines by the determination unit 212 whether the temperature of the substrate 24 is indicated to be greater than or equal to the first temperature T1 (step SB55). The determination of step SB55 is an example of "determining whether to calibrate the colorimetry unit".

On the other hand, when determining that the determination by the determination unit 212 indicates the temperature of the substrate 24 is greater than or equal to the first temperature T1 (step SB52: YES), the colorimetry control unit 213 controls the movement unit 202 to move the carriage 25 from the calibration execution position I2 to the standby position I1 without calibrating the colorimetry unit 20. When the carriage 25 reaches the standby position I1, the colorimetry control unit 213 controls the movement unit 202 again to move the carriage 25 in the second direction K2 from the standby position I1 and performs colorimetry of the patch image row R that is the colorimetry target (step SB54). Upon completion of colorimetry, the colorimetry control unit 213 determines by the determination unit 212 whether the temperature of the substrate 24 is indicated to be greater than or equal to the first temperature T1 (step SB55).

Returning to the description of step SB51, when determining that colorimetry of the patch image row R will have been performed a plurality of times since the LED 23 is turned on (step SB51: NO), the colorimetry control unit 213 moves the carriage 25 in the second direction K2 from the standby position I1 and performs colorimetry of the patch image row R (step SB56).

Upon completion of colorimetry of the patch image row R that is the colorimetry target, the colorimetry control unit 213 determines by the determination unit 212 whether the temperature of the substrate 24 is indicated to be greater than or equal to the first temperature T1 (step SB55).

When determining that the determination by the determination unit 212 indicates the temperature of the substrate 24 is less than the first temperature T1 (step SB 55: NO), the colorimetry control unit 213 causes the carriage 25 to continue moving in the second direction K2 to move the carriage 25 to the calibration execution position I2, and calibrates the colorimetry unit 20 (step SB57). Upon completion of calibration of the colorimetry unit 20, the colorimetry control unit 213 moves the carriage 25 from the calibration execution position I2 to the standby position I1 (step SB58).

On the other hand, when determining that the determination by the determination unit 212 indicates the temperature of the substrate 24 is greater than or equal to the first temperature T1 (step SB55: YES), the colorimetry control unit 213 switches the movement direction of the carriage 25 to the first direction K1 and moves the carriage 25 to the standby position I1 without calibrating the colorimetry unit 20 (step SB58).

Returning to the description of FIG. 7, upon completion of colorimetry by the colorimetry control unit 213 of the patch image row R that is the colorimetry target, the colorimetry device communication control unit 211 outputs a colorimetry completion notification to the control device processor 110 (step SB5).

As illustrated in the flowchart FA, the colorimetry device corresponding unit 113 determines whether a colorimetry completion notification has been received from the colorimetry device 2 (step SA6). When determining that no colorimetry completion notification has been received from the colorimetry device 2 (step SA6: NO), the colorimetry device corresponding unit 113 performs the processing of step SA6 again.

On the other hand, when the colorimetry device corresponding unit 113 determines that a colorimetry completion notification has been received from the colorimetry device 2

(step SA6: YES), the printing control unit 112 determines whether there is a patch image row R of which no colorimetry has been performed (step SA7). For example, the number of patch image rows R included in the color chart image CG is recorded in the color chart image data 123, and the printing control unit 112 performs the determination of step SA7 based on this record.

When determining that there is a patch image row R of which no colorimetry has been performed (step SA7: YES), the printing control unit 112 resumes the transport of the printing medium M, and performs the processing of step SA4 and thereafter again.

On the other hand, when determining that there is no patch image row R of which no colorimetry has been performed (step SA7: NO), i.e., when colorimetry of all the patch image rows R has been performed, the colorimetry device corresponding unit 113 outputs a colorimetry completion instruction to the colorimetry device 2 (step SA8).

As illustrated in the flowchart FB, the colorimetry device communication control unit 211 determines whether a colorimetry completion instruction has been received (step SB6). When determining that no colorimetry completion instruction has been received (step SB6: NO), the colorimetry device communication control unit 211 performs the processing of step SB3.

On the other hand, when determining that a colorimetry completion instruction has been received (step SB6: YES), the colorimetry device communication control unit 211 causes the LED 23 to be turned off (step SB7).

Next, the colorimetry device communication control unit 211 transmits the measurement data 124 including a colorimetric value temporarily stored in the colorimetry device memory 220 to the control device 100 (step SB8).

As illustrated in the flowchart FA, the colorimetry device corresponding unit 113 receives the measurement data 124 from the colorimetry device 2 (step SA9), and stores the received measurement data 124 in the control device memory 120 (step SA10).

As described above, a colorimetry device 2 includes: a support member 26 configured to support a printing medium M; a colorimetry unit 20 including an irradiation unit 21 including an LED 23 configured to irradiate a color chart image CG printed on the printing medium M supported by the support member 26 with light and a substrate 24 provided with the LED 23, and a light-receiving unit 22 configured to receive reflected light that is light irradiated from the LED 23 and reflected by the color chart image CG, the colorimetry unit 20 being configured to perform colorimetry of the color chart image CG; a movement unit 202 configured to cause the colorimetry unit 20 to reciprocate along an intersecting direction K; a calibration member 31 that is provided in the intersecting direction K and that is used for calibration of the colorimetry unit 20; a temperature sensor 30 configured to detect a temperature of the substrate 24; and a colorimetry device control unit 200. In performing colorimetry of the color chart image CG, the colorimetry device control unit 200 determines whether the colorimetry unit 20 is to be calibrated based on the temperature of the substrate 24 detected by the temperature sensor 30. Furthermore, when determining that the colorimetry unit 20 is to be calibrated for the colorimetry of the color chart image CG, the colorimetry device control unit 200 moves the colorimetry unit 20 by the movement unit 202 to the calibration member 31 and calibrates the colorimetry unit 20.

According to this configuration, the colorimetry unit 20 is calibrated when it is determined that colorimetry unit 20 is to be calibrated based on the temperature of the substrate 24. Thus, the number of times the colorimetry unit 20 is calibrated in performing colorimetry of the color chart image CG can be reduced. Accordingly, the time required for performing colorimetry can be shortened.

The colorimetry device 2 includes a colorimetry device memory 220 that stores the first temperature information 222 indicating the first temperature T1. The colorimetry device control unit 200 determines whether the temperature of the substrate 24 detected by the temperature sensor 30 is greater than or equal to the first temperature T1 and, when determining that the temperature of the substrate 24 is less than the first temperature T1, calibrates the colorimetry unit 20.

According to this configuration, the colorimetry unit 20 is calibrated when the temperature of the substrate 24 is less than the first temperature T1, which makes it possible to further reduce the number of times the colorimetry unit 20 is calibrated in performing colorimetry of the color chart image CG. Accordingly, the time required for performing colorimetry can be further shortened.

The first temperature T1 is the temperature of the substrate 24 when the difference between the reference amount of light received and the amount of light received by the light-receiving unit 22 is at the first threshold TH1.

According to this configuration, the colorimetry unit 20 is calibrated when the colorimetric accuracy can decrease, which makes it possible to reduce the number of times the colorimetry unit 20 is calibrated in performing colorimetry of the color chart image CG. Accordingly, the time required for performing colorimetry can be shortened while ensuring colorimetric accuracy.

The colorimetry device control unit 200 modifies the movement range of the colorimetry unit 20 by the movement unit 202 in accordance with the width of the printing medium M or the width of the color chart image CG in the intersecting direction K.

According to this configuration, the movement range of the colorimetry unit 20 is modified in accordance with the width of the printing medium M or the width of the color chart image CG in the intersecting direction K, which prevents the colorimetry unit 20 from being moved over the entire movable range IH in the intersecting direction K. Accordingly, the time required for performing colorimetry can be further shortened.

Furthermore, the printer 1 includes the colorimetry device 2.

According to this configuration, advantageous effects similar to those of the colorimetry device 2 described above can be obtained.

Furthermore, a calibration method by the colorimetry device 2 includes: determining whether the colorimetry unit 20 is to be calibrated based on the temperature of the substrate 24 detected by the temperature sensor 30; and when determining that the colorimetry unit 20 is to be calibrated, moving the colorimetry unit 20 to the calibration member 31 used for calibration of the colorimetry unit 20 and calibrating the colorimetry unit 20.

According to this configuration, advantageous effects similar to those of the colorimetry device 2 described above can be obtained.

Second Embodiment

Next, a second embodiment will be described.

For configurations of the components of the printer 1 according to the second embodiment, those having the same configurations as the corresponding ones in the first embodiment are denoted by the same reference signs, with description thereof being omitted.

Figure 9:
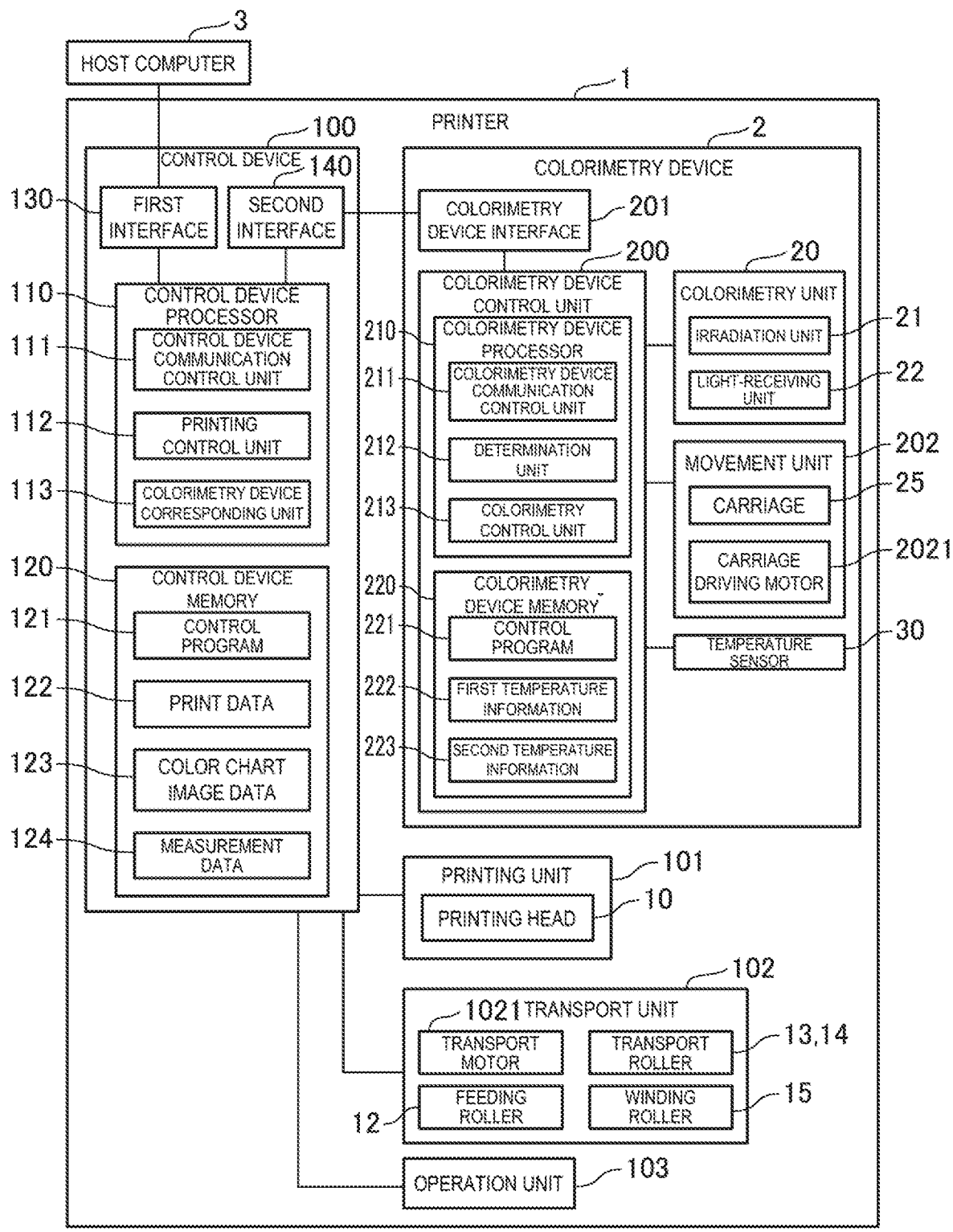
FIG. 9 is a block diagram illustrating a configuration of a control system of a printer.

FIG. 9 is a block diagram illustrating a configuration of a control system of the printer 1 according to the second embodiment.

As is clear from comparison between FIG. 9 and FIG. 4, the colorimetry device 2 of the second embodiment further stores second temperature information 223 compared to the colorimetry device 2 of the first embodiment. The colorimetry device memory 220 stores the second temperature information 223. A second temperature T2 indicated by the second temperature information 223 is a temperature lower than the first temperature T1.

When the LED 23 is turned on, the determination unit 212 of the second embodiment determines whether the temperature of the substrate 24 detected by the temperature sensor 30 is less than the second temperature T2, greater than or equal to the second temperature T2 and less than the first temperature T1, or greater than or equal to the first temperature T1. This determination is performed every time a predetermined period of time elapses. The predetermined period of time is one second, for example. Every time it makes a determination, the determination unit 212 outputs determination results to the colorimetry control unit 213.

When the determination by the determination unit 212 indicates a temperature less than the second temperature T2, the colorimetry control unit 213 of the second embodiment calibrates the colorimetry unit 20 each time the carriage 25 makes one reciprocating movement. In other words, when the determination by the determination unit 212 indicates a temperature less than the second temperature T2, the colorimetry control unit 213 calibrates the colorimetry unit 20 for each patch image row R. When calibrating the colorimetry unit 20 for each patch image row R, the colorimetry control unit 213 corrects colorimetric values acquired most recently after the calibration based on the calibration performed most recently, with the corrected colorimetric values temporarily stored in the colorimetry device memory 220.

When the determination by the determination unit 212 indicates a temperature greater than or equal to the second temperature T2 and less than the first temperature T1, the colorimetry control unit 213 of the second embodiment calibrates the colorimetry unit 20 each time the carriage 25 makes N reciprocating movements. N is an integer of two or greater. In other words, when the determination by the determination unit 212 indicates a temperature less than the second temperature T2, the colorimetry control unit 213 calibrates the colorimetry unit 20 for every N patch image rows R. When calibrating the colorimetry unit 20 for every N patch image rows R, the colorimetry control unit 213 corrects colorimetric values acquired after the calibration based on the calibration performed most recently, with the corrected colorimetric values temporarily stored in the colorimetry device memory 220.

When the determination by the determination unit 212 indicates a temperature greater than or equal to the first temperature T1, the colorimetry control unit 213 of the second embodiment performs colorimetry of the color chart image CG without calibrating the colorimetry unit 20. When the determination by the determination unit 212 indicates a temperature greater than or equal to the first temperature T1, the colorimetry control unit 213 temporarily stores the colorimetric value of the patch image row R in the colorimetry device memory 220 as is.

The first temperature T1 indicated by the first temperature information 222 of the second embodiment is determined in a manner similar to that of the first embodiment. Similar to the first temperature T1, the second temperature T2 indicated by the second temperature information 223 is determined by a predetermined process during manufacturing or shipping of the colorimetry device 2. The second temperature T2 is determined for each colorimetry device 2. Hereinafter, determination of the second temperature T2 will be described with reference to FIG. 10.

Figure 10:
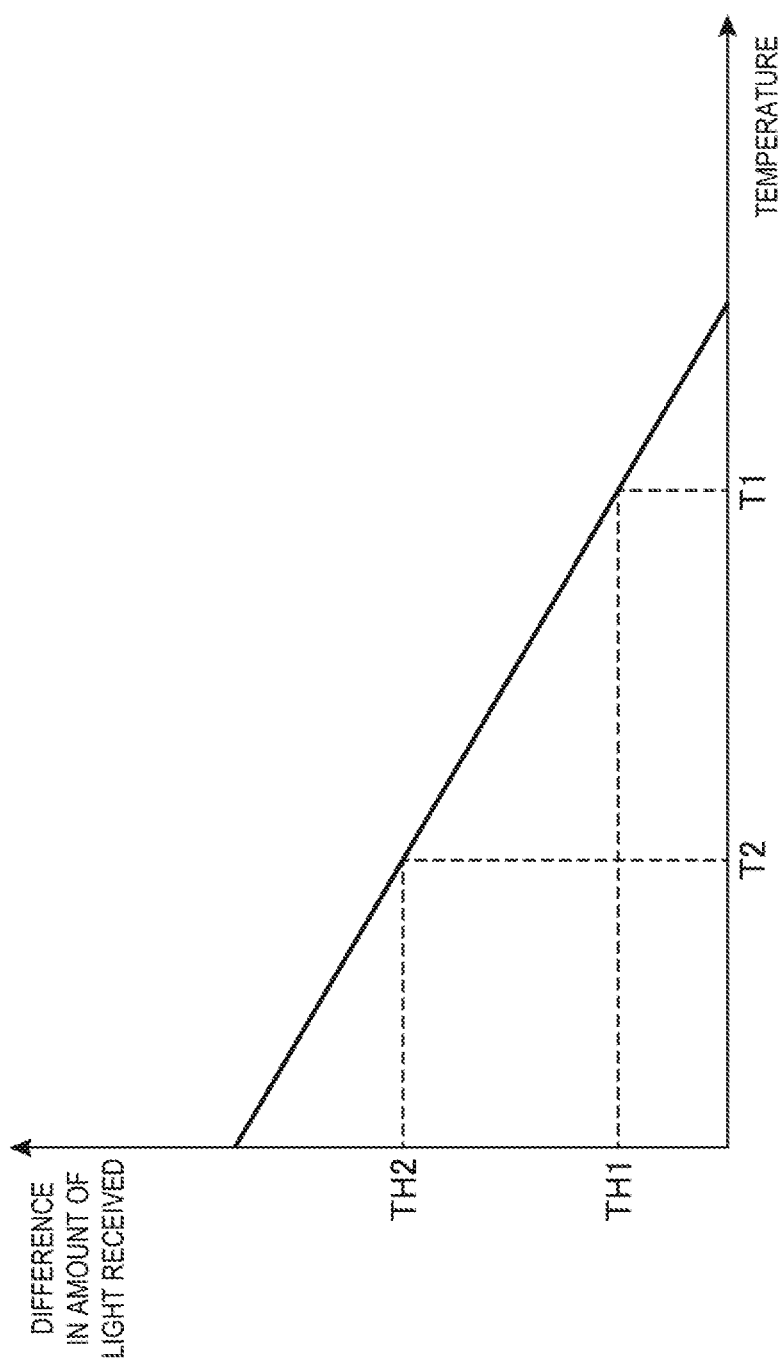
FIG. 10 is a table showing the change in temperature of a substrate and the change in difference in the amount of light received.

FIG. 10 is a table showing the change in difference in the amount of light received relative to the temperature of the substrate 24. In FIG. 10, the horizontal axis indicates the temperature of the substrate 24, and the vertical axis indicates the difference in the amount of light received.

The graph GF3 illustrated in FIG. 10 indicates the change in difference in the amount of light received relative to the temperature of the substrate 24. The graph GF3 illustrated in FIG. 10 is the same as the graph GF3 illustrated in FIG. 6, and is derived by the graphs GF1 and GF2.

The second temperature T2 is a temperature at which the difference in the amount of light received is at a second threshold TH2 in the graph GF3. The second threshold TH2 is a value greater than the first threshold TH1. When the colorimetry unit 20 is calibrated each time the carriage 25 makes N reciprocating movements, the second threshold TH2 is a value indicating an upper limit of the difference in the amount of light received that is acceptable as the colorimetric accuracy of the colorimetry device 2. The second threshold TH2 is appropriately defined in advance based on preliminary tests, simulations, or the like.

The second temperature T2 is determined, from the graph GF3, as a temperature at which the difference in the amount of light received is at the second threshold TH2. The second temperature information 223 indicating the determined second temperature T2 is stored in the colorimetry device memory 220 in a predetermined process during manufacturing or shipping of the colorimetry device 2.

The operation of the printer 1 according to the second embodiment will be described.

In the operation of the printer 1 according to the second embodiment, the operation of the colorimetry device 2 in the colorimetry processing is different.

Figure 11:
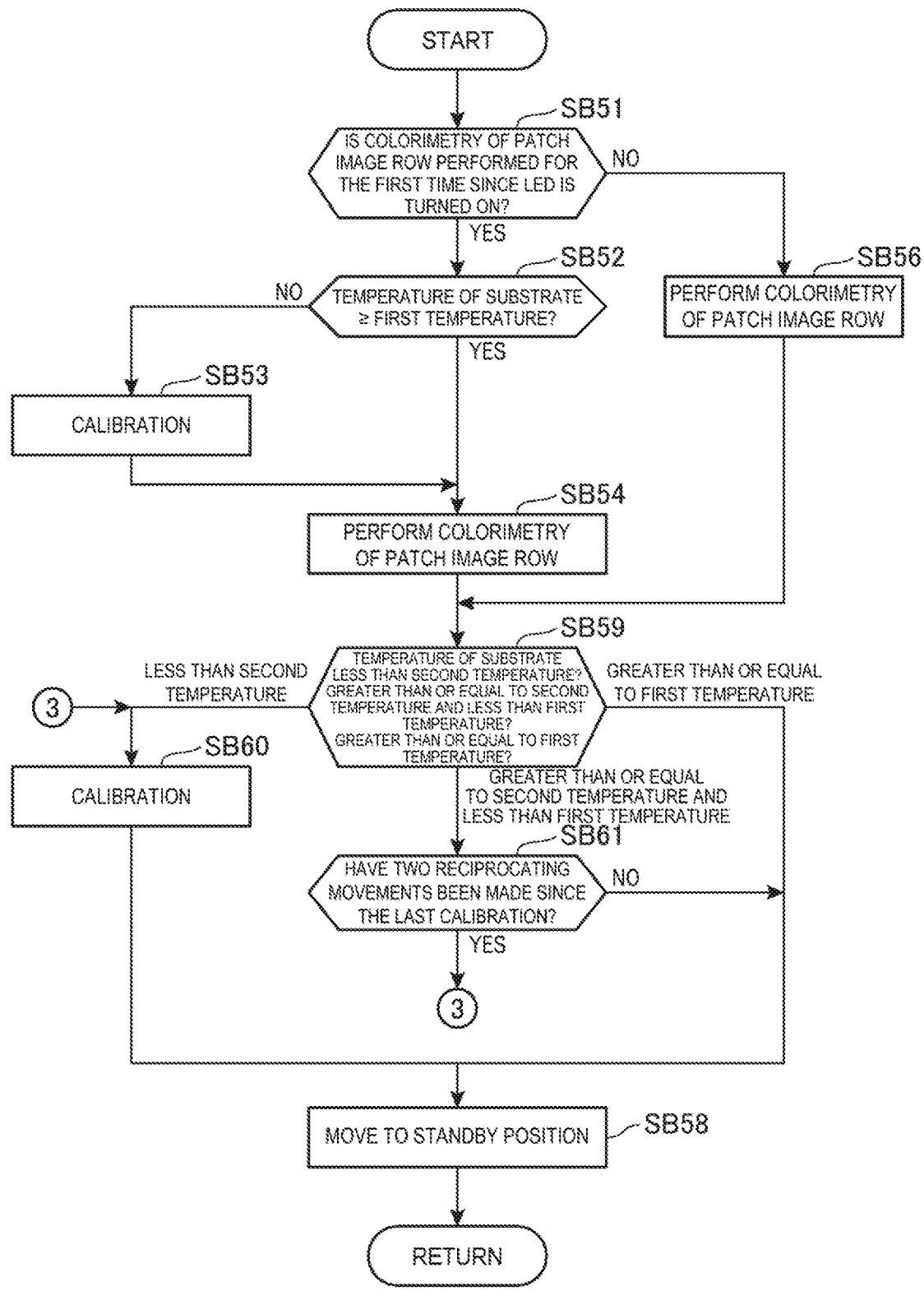
FIG. 11 is a flowchart illustrating an operation of a colorimetry device.

FIG. 11 is a flowchart illustrating an operation of the colorimetry device 2 in the colorimetry processing. In the operation of the colorimetry device 2 illustrated in FIG. 11, a case in which the colorimetry unit 20 is calibrated each time the carriage 25 makes two reciprocating movements is illustrated.

In FIG. 11, the same steps as those given in the flowchart illustrated in FIG. 8 are denoted by the same step numbers, with detailed description thereof being omitted.

When colorimetry of the patch image row R is performed in step SB54 or step SB56, the colorimetry control unit 213 determines whether the determination by the determination unit 212 indicates a temperature less than the second temperature T2, a temperature greater than or equal to the second temperature T2 and less than the first temperature T1, or a temperature greater than or equal to the first temperature T1 (step SB59). The determination of step SB59 is an example of "determining whether to calibrate the colorimetry unit".

When determining that the determination by the determination unit 212 indicates a temperature less than the second temperature T2 (step SB59: less than the second temperature), the colorimetry control unit 213 controls the movement unit 202 to move the carriage 25 to the calibration execution position I2 and calibrates the colorimetry unit 20 (step SB60). Upon completion of calibration of the colorimetry unit 20, the colorimetry control unit 213 controls the movement unit 202 to move the carriage 25 to the standby position I1 (step SB58).

When determining that the determination by the determination unit 212 indicates a temperature greater than or equal to the second temperature T2 and less than the first temperature T1 (step SB59: greater than or equal to the second temperature and less than the first temperature), the colorimetry control unit 213 determines whether the carriage 25 has made two reciprocating movements since the last time the colorimetry unit 20 was calibrated (step SB61). For example, whether two reciprocating movements have been made is determined based on whether the carriage 25 has been located at the standby position I1 twice since the last time the colorimetry unit 20 was calibrated.

When determining that the carriage 25 has not made two reciprocating movements since the last time the colorimetry unit 20 was calibrated (step SB61: NO), the colorimetry control unit 213 moves the carriage 25 to the standby position I1 without calibrating the colorimetry unit 20 (step SB58). On the other hand, when determining that the carriage 25 has made two reciprocating movements since the last time the colorimetry unit 20 was calibrated (step SB61: YES), the colorimetry control unit 213 calibrates the colorimetry unit 20 (step SB60), and moves the carriage 25 to the standby position I1 (step SB58).

Returning to the description of step SB59, when determining that the determination by the determination unit 212 indicates a temperature greater than or equal to the first temperature T1 (step SB59: greater than or equal to the first temperature), the colorimetry control unit 213 moves the carriage 25 to the standby position I1 without calibrating the colorimetry unit 20 (step SB58).

As described above, the colorimetry device memory 220 stores the second temperature information 223 indicating the second temperature T2 lower than the first temperature T1. When the temperature of the substrate 24 detected by the temperature sensor 30 is less than the second temperature T2, the colorimetry device control unit 200 calibrates the colorimetry unit 20 each time the colorimetry unit 20 makes one reciprocating movement in the intersecting direction K. When the temperature of the substrate 24 detected by the temperature sensor 30 is greater than or equal to the second temperature T2 and less than the first temperature T1, the colorimetry device control unit 200 calibrates the colorimetry unit 20 each time the colorimetry unit 20 makes N reciprocating movements in the intersecting direction K, where N is an integer of two or greater.

According to this configuration, the number of times the colorimetry unit 20 is calibrated is varied in accordance with the temperature of the substrate 24. Therefore, the number of times the colorimetry unit 20 is calibrated in performing colorimetry can be further reduced. Accordingly, the time required for performing colorimetry can be further shortened.

The first temperature T1 is the temperature of the substrate 24 when the difference between the reference amount of light received and the amount of light received by the light-receiving unit 22 is at the first threshold TH1. The second temperature T2 is the temperature of the substrate 24 when the difference between the reference amount of light received and the amount of light received by the light-receiving unit 22 is at the second threshold TH2. The second threshold TH2 is greater than the first threshold TH1.

According to this configuration, the colorimetry unit 20 is calibrated when the colorimetric accuracy can decrease, which makes it possible to reduce the number of times the colorimetry unit 20 is calibrated in performing colorimetry of the color chart image CG. Accordingly, the time required for performing colorimetry can be shortened while ensuring colorimetric accuracy.

Each of the above embodiments only illustrates a specific example to which the present disclosure is applied. The present disclosure is not limited to the configurations of the embodiments described above, and can be carried out in various aspects without departing from the gist of the disclosure.

In each of the embodiments described above, the temperature sensor 30 is configured to detect the temperature of the substrate 24. However, the temperature sensor 30 may be configured to detect the temperature of the LED 23. When the temperature sensor 30 is configured to detect the temperature of the LED 23, the first temperature T1 and the second temperature T2 are determined based on the change in temperature of the LED 23 relative to the elapsed time since the LED 23 is turned on, and the change in difference in the amount of light received relative to the elapsed time. The characteristics of these changes are derived for each colorimetry device 2 by a predetermined process during manufacturing or shipping of the colorimetry device 2. Furthermore, when the temperature sensor 30 is configured to detect the temperature of the LED 23, the determination unit 212 of the first embodiment determines whether the temperature of the LED 23 is greater than or equal to the first temperature T1. Furthermore, when the temperature sensor 30 is configured to detect the temperature of the LED 23, the determination unit 212 of the second embodiment determines whether the temperature of the LED 23 is less than the second temperature T2, greater than or equal to the second temperature T2 and less than the first temperature T1, or greater than or equal to the first temperature T1. Furthermore, when the temperature sensor 30 is configured to detect the temperature of the LED 23, the colorimetry control unit 213 performs the processing of steps SB52, SB55, and SB59 based on determination results regarding the temperature of the LED 23 in a manner similar to when the temperature sensor 30 is configured to detect the temperature of the substrate 24.

In each of the embodiments described above, the light source of the present disclosure is illustrated by the LED 23. However, the light source of the present disclosure is not limited to the LED 23. Any other light source may be employed as long as it is a light source of which the temperature and the amount of light emitted change relative to the elapsed time since being turned on. In this case, the first temperature T1 and the second temperature T2 are determined for each colorimetry device 2 based on the graphs GF1, GF2, and GF3 corresponding to such other light source.

In each of the embodiments described above, colorimetry is performed with a color chart image CG printed by the printer 1. However, colorimetry may be performed with a medium on which a color chart image CG is printed in advance.

Printing devices to which the present disclosure is applicable are not limited to the printer 1. For example, the present disclosure may be applied to a printing device that discharges the printing medium M after printing to the outside of the printing device.

The control device processor 110 and the colorimetry device processor 210 may be constituted by a plurality of processors, or may be constituted by a single processor. The control device processor 110 and the colorimetry device processor 210 may be hardware programmed to realize functions of the components to be described later. In other words, the control device processor 110 and the colorimetry device processor 210 include an application-specific integrated circuit (ASIC) or a field programmable gate array (FPGA), for example.

The components illustrated in FIGS. 2 and 9 are examples, and their specific implementations are not particularly limited. That is, it is not necessarily required that hardware that individually corresponds to each of the components be implemented. As a matter of course, a configuration can be employed in which one processor executes a program to realize the functions of the components. Furthermore, in the embodiments described above, some of the functions realized by software may be realized by hardware, or some of the functions realized by hardware may be realized by software. Specific details of other components of the printer 1 and the colorimetry device 2 can also be modified as desired.

The units of steps of the operation illustrated in FIGS. 7, 8, and 11 are divided in accordance with the content of the main processing to facilitate understanding of the operation of the control device 100 and the colorimetry device 2. Thus, the present disclosure is not limited by how the units of processing are divided and named. Depending on the content of the processing, the operation may be divided into a greater number of units of steps. The operation may also be divided such that one unit of step includes more processing. The order of the steps may also be switched as appropriate as long as it is within the scope of the present disclosure.

The present disclosure is not limited to the embodiments described above, and can be realized in various configurations without departing from the scope of the present disclosure. For example, any technical features in the embodiments that correspond to technical features in the aspects described in the SUMMARY section can be replaced or combined as appropriate to solve some or all of the problems described above or to achieve some or all of the advantageous effects described above. Furthermore, when technical features are not described herein as essential technical features, such technical features may be deleted as appropriate.

What is claimed is:

1. A colorimetry device comprising:
    a support surface configured to support a medium;
    a colorimetry unit including an irradiation unit including a light source configured to irradiate an image printed on the medium supported by the support surface with light and a substrate provided with the light source, and a light-receiving sensor configured to receive reflected light that is light irradiated from the light source and reflected by the image, the colorimetry unit being configured to perform colorimetry of the image;
    a movement carriage configured to cause the colorimetry unit to reciprocate along a predetermined direction;
    a calibration member that is provided in the predetermined direction and that is used for calibration of the colorimetry unit, the calibration member comprising a white board that reflects light from the light source;
    a temperature detecting sensor configured to detect a temperature of the light source or a temperature of the substrate;
    a medium holder that is attached to support surface and configured to press the medium against the support surface when the colorimetry unit performs colorimetry of the image, the medium holder comprising a colorimetric window that penetrates the medium holder to expose the medium; and
    a controller configured to determine, for the colorimetry of the image, whether to calibrate the colorimetry unit based on the temperature of the light source or the temperature of the substrate detected by the temperature detecting sensor and, when determining, for the colorimetry of the image, that the colorimetry unit is to be calibrated, move the colorimetry unit by the movement carriage to the calibration member and calibrate the colorimetry unit.

2. The colorimetry device according to claim 1, comprising:
    a storage unit configured to store first temperature information indicating a first temperature; wherein
    the controller determines whether the temperature of the light source or the temperature of the substrate detected by the temperature detecting sensor is greater than or equal to the first temperature and
    when determining that the temperature of the light source or the temperature of the substrate is less than the first temperature, the controller calibrates the colorimetry unit.

3. The colorimetry device according to claim 2, wherein the first temperature is a temperature of the light source or a temperature of the substrate when difference between a reference amount of light received and an amount of light received by the light-receiving sensor is at a first threshold.

4. The colorimetry device according to claim 1, wherein
    a storage unit stores second temperature information indicating a second temperature lower than a first temperature,
    when the temperature of the light source or the temperature of the substrate detected by the temperature detecting sensor is less than the second temperature, the controller calibrates the colorimetry unit each time the colorimetry unit makes one reciprocating movement in the predetermined direction, and
    when the temperature of the light source or the temperature of the substrate detected by the temperature detecting sensor is greater than or equal to the second temperature and less than the first temperature, the controller calibrates the colorimetry unit each time the colorimetry unit makes N reciprocating movements in the predetermined direction, where N is an integer of two or greater.

5. The colorimetry device according to claim 4, wherein the first temperature is a temperature of the light source or a temperature of the substrate when a difference between a reference amount of light received and an amount of light received by the light-receiving sensor is at a first threshold,
    the second temperature is a temperature of the light source or a temperature of the substrate when the difference between the reference amount of light received and the amount of light received by the light-receiving sensor is at a second threshold, and
    the second threshold is greater than the first threshold.

6. The colorimetry device according to claim 1, wherein the controller modifies a movement range of the colorimetry unit by the movement unit in accordance with a width of the medium or a width of the image in the predetermined direction.

7. A printing device comprising a colorimetry device, the colorimetry device including:
    a support surface configured to support a medium;
    a colorimetry unit including an irradiation unit including a light source configured to irradiate an image printed on the medium supported by the support surface with light and a substrate provided with the light source, and a light-receiving sensor configured to receive reflected light that is light irradiated from the light source and reflected by the image, the colorimetry unit being configured to perform colorimetry of the image;

a movement carriage configured to cause the colorimetry unit to reciprocate along a predetermined direction;

a calibration member that is provided in the predetermined direction and that is used for calibration of the colorimetry unit, the calibration member comprising a white board that reflects light from the light source;

a temperature detecting sensor configured to detect a temperature of the light source or a temperature of the substrate;

a medium holder that is attached to support surface and configured to press the medium against the support surface when the colorimetry unit performs colorimetry of the image, the medium holder comprising a colorimetric window that penetrates the medium holder to expose the medium; and a controller configured to determine, for the colorimetry of the image, whether to calibrate the colorimetry unit based on the temperature of the light source or the temperature of the substrate detected by the temperature detecting sensor and, when determining that the colorimetry unit is to be calibrated for the colorimetry of the image, move the colorimetry unit by the movement carriage to the calibration member and calibrate the colorimetry unit.

8. A calibration method by a colorimetry device including
a colorimetry unit that includes a light source configured to irradiate an image printed on a medium supported by a support surface with light and a substrate provided with the light source and that is configured to perform colorimetry of the image, a temperature detecting sensor configured to detect a temperature of the light source or a temperature of the substrate, a medium holder that is attached to support surface and configured to press the medium against the support surface when the colorimetry unit performs colorimetry of the image, the medium holder comprising a colorimetric window that penetrates the medium holder to expose the medium; and the method comprising:

determining, for the colorimetry of the image, whether to calibrate the colorimetry unit based on the temperature of the light source or the temperature of the substrate detected by the temperature detecting sensor, when determining that the colorimetry unit is to be calibrated for the colorimetry of the image, moving the colorimetry unit to a calibration member used for calibration of the colorimetry unit, the calibration member comprising a white board that reflects light from the light source, and calibrating the colorimetry unit and calibrating the colorimetry unit.

* * * * *